United States Patent
Takamatsu

(10) Patent No.: US 8,494,741 B2
(45) Date of Patent: Jul. 23, 2013

(54) CONTROL DEVICE FOR VEHICLE

(75) Inventor: Hideki Takamatsu, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1266 days.

(21) Appl. No.: 10/991,858

(22) Filed: Nov. 19, 2004

(65) Prior Publication Data

US 2005/0131587 A1 Jun. 16, 2005

(30) Foreign Application Priority Data

Dec. 12, 2003 (JP) ................................. 2003-415242

(51) Int. Cl.
*G06F 19/00* (2011.01)
*G05D 1/00* (2006.01)

(52) U.S. Cl.
USPC ........ 701/70; 701/1; 701/36; 701/91; 701/93; 701/400; 701/408; 180/170; 340/937; 348/113; 348/143

(58) Field of Classification Search
USPC ...... 701/1, 36, 70, 91, 93, 200, 201; 340/937; 180/170; 348/113, 143
See application file for complete search history.

(56) References Cited

U.S. PATENT DOCUMENTS

| | | | | |
|---|---|---|---|---|
| 5,521,823 A | * | 5/1996 | Akita et al. | 701/36 |
| 5,644,488 A | * | 7/1997 | Ito et al. | 701/1 |
| 5,680,123 A | * | 10/1997 | Lee | 340/937 |
| 5,864,285 A | | 1/1999 | Wieder et al. | |
| 6,006,144 A | | 12/1999 | Takahashi et al. | |
| 6,275,772 B1 | * | 8/2001 | Sugimoto et al. | 701/301 |
| 6,285,393 B1 | * | 9/2001 | Shimoura et al. | 348/119 |
| 6,483,442 B2 | * | 11/2002 | Shimizu et al. | 340/932.2 |
| 6,515,597 B1 | * | 2/2003 | Wada et al. | 340/988 |
| 6,549,130 B1 | * | 4/2003 | Joao | 340/539.14 |
| 6,564,123 B2 | | 5/2003 | Hahn et al. | |
| 6,577,334 B1 | * | 6/2003 | Kawai et al. | 348/148 |
| 6,862,537 B2 | * | 3/2005 | Skrbina et al. | 702/32 |
| 6,940,423 B2 | * | 9/2005 | Takagi et al. | 340/932.2 |
| 6,959,240 B2 | * | 10/2005 | Okamoto | 701/70 |
| 6,975,929 B2 | * | 12/2005 | Maruyama | 701/35 |

FOREIGN PATENT DOCUMENTS

| | | |
|---|---|---|
| DE | 19607788 | 9/1997 |
| DE | 198 38 818 A1 | 3/2000 |
| DE | 10117650 | 10/2002 |
| DE | 10308668 A1 | 7/2004 |

(Continued)

OTHER PUBLICATIONS

Nov. 15, 2010 Office Action in German Application No. 102004064166.8-51, with translation.

*Primary Examiner* — John Q Nguyen
*Assistant Examiner* — Chuong Nguyen
(74) *Attorney, Agent, or Firm* — Oliff & Berridge, PLC

(57) ABSTRACT

A vehicle control device performs a program including the step of obtaining a target point for movement based on information from a vehicle exterior camera, the step of obtaining a distance X to the target point, the step of resetting a distance counter, the step of causing the vehicle to enter accelerated running at set acceleration, the step of causing the vehicle to change from the accelerated running to constant-speed running when the distance counter reaches X, and the step of causing the vehicle to change from the constant-speed running to decelerated running when the distance counter reaches X.

19 Claims, 7 Drawing Sheets

FOREIGN PATENT DOCUMENTS

| JP | A 6-227317 | 8/1994 |
| JP | A-6-290400 | 10/1994 |
| JP | A 9-48263 | 2/1997 |
| JP | 11-102157 | 4/1999 |
| JP | A 2001-216599 | 8/2001 |
| JP | 2002-331850 | * 12/2002 |

* cited by examiner

F I G. 2
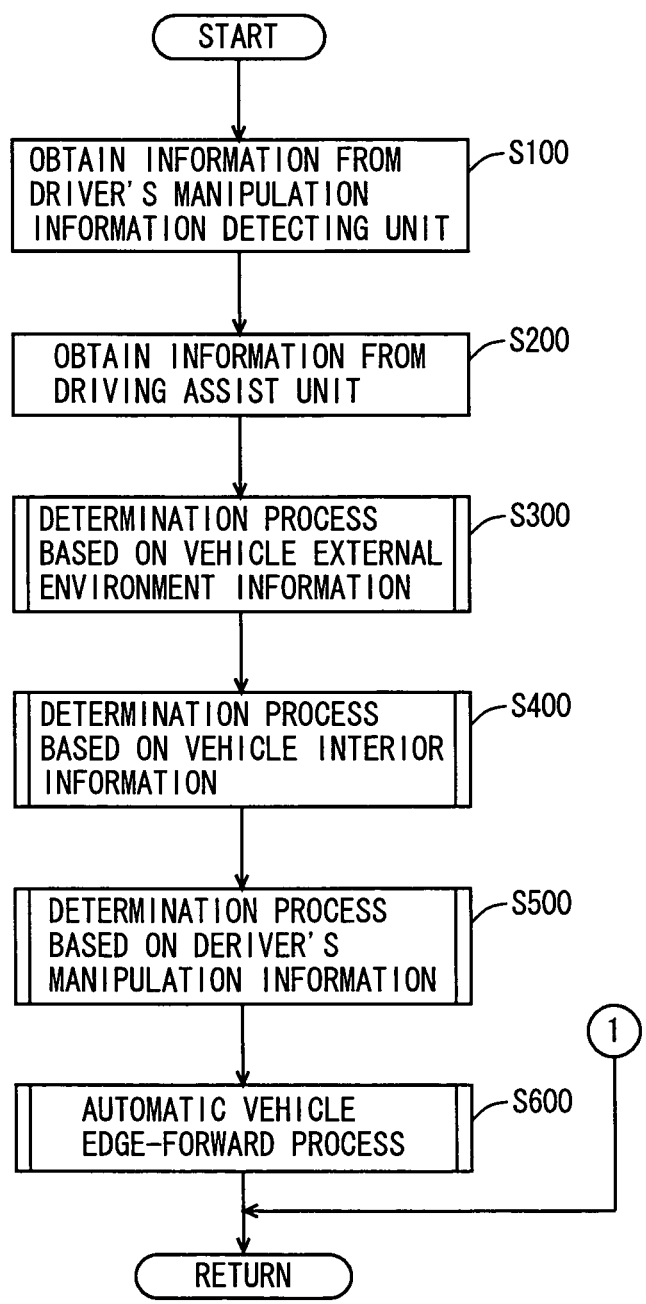

CONTROL DEVICE FOR VEHICLE

This nonprovisional application is based on Japanese Patent Application No. 2003-415242 filed with the Japan Patent Office on Dec. 12, 2003, the entire contents of which are hereby incorporated by reference.

BACKGROUND OF THE INVENTION

1. Field of the Invention

The present invention relates to a control device for assisting driving of a vehicle, and more particularly to a control device assisting manipulation of a driver when the driver wants to move a vehicle by a small distance at an intersection of poor visibility or the like.

2. Description of the Background Art

Various types of systems for assisting manipulation of a driver have been developed, which include, for example, a cruise control system having a speed keeping assist function, a driving assist system having a speed keeping assist function, an inter-vehicle distance keeping assist function and a lane keeping assist function, and a parking assist system for easier parking. These systems can reduce the driver's manipulation burden and at the same time improve safety.

Meanwhile, the driver may want to move the vehicle by a small distance, for example if visibility is poor when exiting from a narrow road onto a wide road, or to pass over a step provided on a pallet of a multistory parking garage.

Japanese Patent Laying-Open No. 09-048263 discloses a driving force control device for a vehicle that enables automatic movement of a vehicle by a small distance, to reduce the burden of a driver and improve safety. The driving force control device for a vehicle is for moving a vehicle having a throttle actuator by a distance desired by a driver. The device includes input means for a driver to input a desired moving distance, throttle control means for causing a throttle opening to be input to the throttle actuator, actual travel distance detecting means for detecting an actual travel distance of the vehicle, and braking force generating means for stopping the vehicle when the detected signal of the actual travel distance detecting means reaches the target moving distance.

In this driving force control device for a vehicle, when the driver inputs a desired moving distance via the input means, the moving distance is reported to the throttle control means and to the braking force generating means. The throttle control means causes a throttle opening to be input to the throttle actuator. Here, the throttle control means gradually increases the throttle opening until the vehicle starts moving with reference to the detected value of the actual travel distance detecting means. When the vehicle starts moving, the actual travel distance detecting means reports the actual travel distance of the vehicle to the throttle control means and to the braking force generating means. When the actual travel distance of the vehicle reaches the moving distance input via the input means, the throttle control means inputs to the throttle actuator a command value designating complete closing of a throttle valve. At the same time, the braking force generating means generates the braking force to stop the vehicle.

With the driving force control device for a vehicle disclosed in Japanese Patent Laying-Open No. 09-048263, however, the driver needs to input a desired moving distance. It means that the driver's manipulation burden would not actually be reduced at the blind intersection of poor visibility or on the pallet of the multistory parking garage as described above if the driver does not know how to decide the distance to be input as the desired moving distance.

SUMMARY OF THE INVENTION

The present invention has been made to solve the above-described problems, and its object is to provide a control device for a vehicle that can reduce manipulation burden of a driver who wants to move a vehicle by a small distance.

A control device for a vehicle according to the present invention performs control to move a vehicle by a small distance. The control device includes: a determination unit determining whether movement by a small distance is necessary or not; an acquisition unit, when it is determined that the movement by the small distance is necessary, acquiring positional information on a control start position where the movement by the small distance is to be started and positional information on a control finish position where the movement by the small distance is to be finished, based on information of the vehicle itself and information of surroundings of the vehicle; and a control unit controlling a driving device and a braking device mounted to the vehicle to move the vehicle from the control start position to the control finish position, based on the positional information acquired.

According to the invention, the determination unit determines whether movement of a vehicle by a small distance is necessary or not based on various pieces of information. For example, if the current position of the vehicle detected by a navigation device corresponds to a blind intersection of poor visibility where the vehicle is to exit from a narrow road onto a wide road, the determination unit determines that the movement by the small distance is necessary. At the time when the movement by the small distance is necessary, the positional information on the control start position and the positional information on the control finish position are automatically acquired by the acquisition unit, without intervention of driver's manipulation, based on the information of the vehicle itself (position of the vehicle detected by the navigation device) or the information of surroundings of the vehicle (circumstances surrounding the vehicle detected by a camera and/or a radar). The control unit controls engine torque as the driving device and brake torque as the braking device in an integrated manner to move the vehicle from the control start position to the control finish position at predetermined acceleration, deceleration and speed. This enables automatic movement of the vehicle by the same distance as required by the driver, without the need for the driver to input the desired moving distance. As a result, it is possible to reduce the manipulation of the driver who wants to move the vehicle by a small distance. Herein, the small distance refers to a distance that is difficult to achieve with the normal accelerator and brake manipulation, which would cause too heavy the driver's manipulation burden. More specifically, the small distance can be interpreted as a distance (of, e.g., less than some ten centimeters or less than some centimeters) that cannot be set precisely with resolution of the driver's accelerator or brake manipulation.

Preferably, the control unit controls acceleration during the movement by the small distance.

According to the invention, the control unit controls the engine torque as the driving device and the braking torque as the braking device to maintain the acceleration during the movement at predetermined acceleration.

Still preferably, the control unit calculates a required driving force to establish the predetermined acceleration from the control start position, and controls the driving device and the braking device based on the required driving force.

According to the invention, the control unit calculates the required driving force such that the predetermined acceleration occurs from the control start position, and controls the engine torque as the driving device and the brake torque as the braking device in an integrated manner to move the vehicle at the predetermined acceleration.

Still preferably, the control unit calculates a required driving force to establish predetermined deceleration from a position ahead of the control finish position, and controls the driving device and the braking device based on the required driving force.

According to the invention, the control unit calculates the required driving force such that the predetermined deceleration occurs from the position a predetermined distance ahead of the control finish position, and controls the engine torque as the driving device and the brake torque as the braking device in an integrated manner so as to move the vehicle at the predetermined deceleration before stopping. The required driving force may take a value to produce positive acceleration or negative acceleration (deceleration).

Still preferably, the control device further includes an external information acquisition unit that acquires information on an external environment of the vehicle. The determination unit determines whether the movement by the small distance is necessary or not based on the information on the external environment of the vehicle.

According to the invention, the external information acquisition unit detects from a navigation device that the current position of the vehicle corresponds to the position where the vehicle is about to exit from a narrow road onto a wide road, or detects from a radar device, a camera or communication with the outside of the vehicle that the surroundings of the vehicle give poor visibility. It thus determines that the movement by the small distance is necessary based on such information on the external environment of the vehicle.

Still preferably, the external information acquisition unit acquires the information on the external environment of the vehicle based on the information acquired by at least one of the navigation device, the radar device, the camera, and the communication with the outside of the vehicle.

According to the invention, the external information acquisition unit can use at least one of the navigation device, the radar device, the camera, and the communication with the outside of the vehicle (e.g., roadside transmitter to vehicle communication between the vehicle and the road infrastructures, vehicle to vehicle communication between the vehicle and another vehicle), to determine that the movement by the small distance is necessary.

Still preferably, the control device further includes an internal information acquisition unit that acquires information on motions of the driver of the vehicle. The determination unit determines whether the movement by the small distance is necessary or not based on the information on the motions of the driver.

According to the invention, the internal information acquisition unit detects that the surroundings of the vehicle give poor visibility, from the driver's accelerator manipulation, brake manipulation, gear shifting manipulation (whether driving force is required or not), steering manipulation, or from the driver's posture leaning forward and looking to the right and left, and determines that the movement by the small distance is necessary based on such information on the motions of the driver as described above.

Still preferably, the internal information acquisition unit acquires the information on the motions of the driver based on information acquired by at least one of a vehicle driving manipulation unit and a vehicle interior camera.

According to the present invention, the internal information acquisition unit uses at least one of the vehicle driving manipulation unit and the vehicle interior camera picking up an image within the vehicle, to determine that the movement by the small distance is necessary.

Still preferably, the vehicle driving manipulation unit is one of an accelerator manipulation member, a brake manipulation member, and a small distance movement requesting manipulation member.

According to the present invention, it is possible to determine that the movement by the small distance is necessary based on the fact that the accelerator pedal as an example of the accelerator manipulation member and the brake pedal as an example of the brake manipulation member are manipulated repeatedly, or on the fact that a switch as the small distance movement requesting manipulation member is depressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flowchart illustrating a control structure of a main program that is executed at a vehicle control device of the vehicle control system according to the embodiment of the present invention.

DESCRIPTION OF THE PREFERRED EMBODIMENTS

Figure 1:
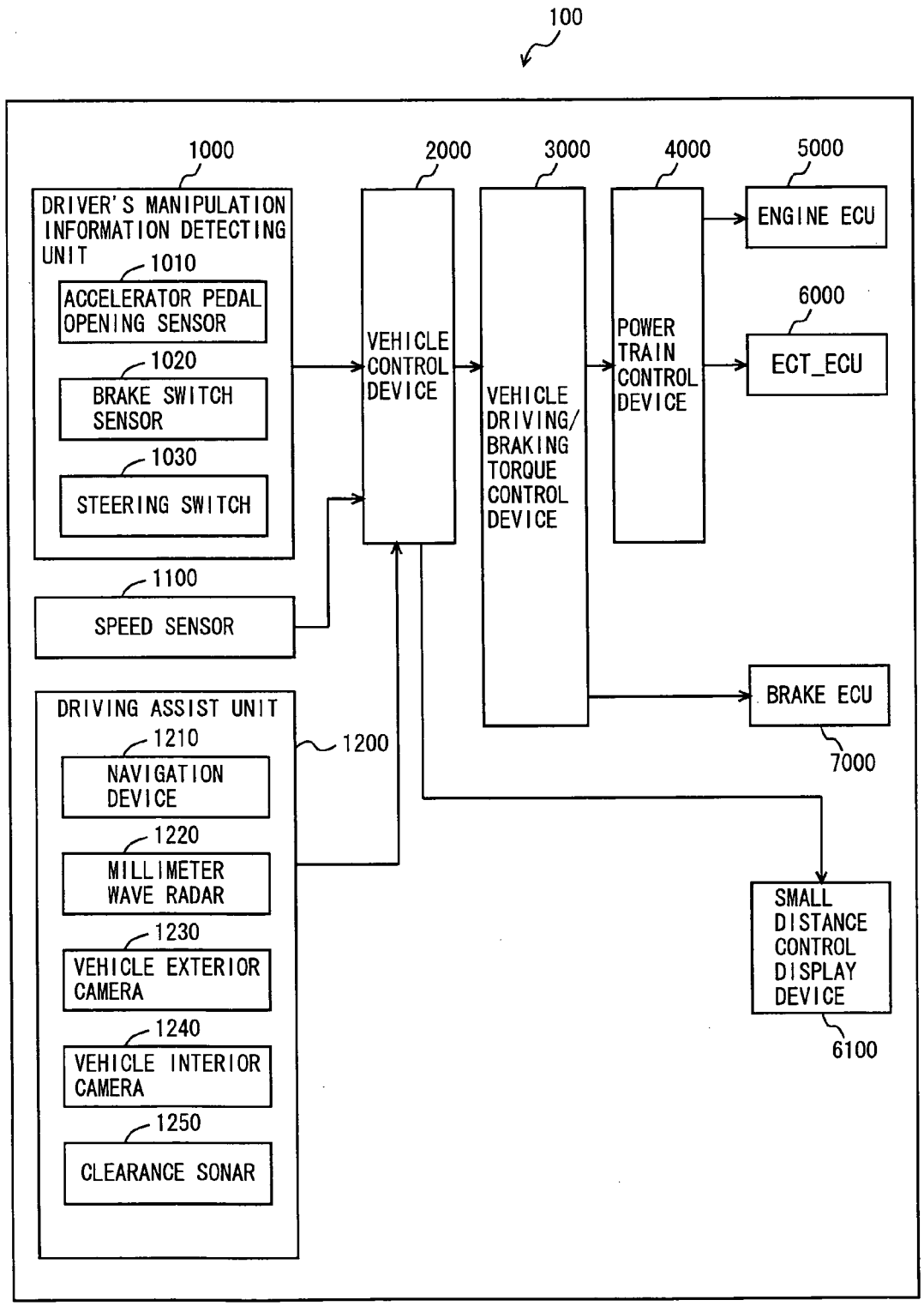
FIG. 1 is a control block diagram of a vehicle control system according to an embodiment of the present invention.

Hereinafter, an embodiment of the present invention will be described with reference to the drawings. In the following description, the same elements have the same reference characters allotted. Their names and functions are also identical. Therefore, detailed description thereof will not be repeated.

It is noted that the power train of the vehicle to be mounted with the vehicle control system according to the embodiment of the present invention shown below is not specifically limited. For example, an automatic transmission may have a geared transmission, or it may be a belt-type continuously variable transmission.

Further, a hybrid power train may be employed, which has an engine and motor generators mounted as driving sources of the vehicle, and a power split mechanism using a planetary gear mechanism splits motive power of the engine into driving force for the vehicle and driving force for the motor generators. The electric power generated may be used directly for driving the motors, or converted by an inverter to a direct current to charge a high-voltage battery. In the planetary gear mechanism used for the power split mechanism, the turning force of the engine is input to a planetary carrier, and then transmitted via a sun gear to the motor generators and also transmitted via a ring gear to the motors and the output shaft. In the power train having such a configuration, the motor generators connected to the planetary gear mechanism may be controlled to make it function as a continuously variable transmission that controls the engine revolution number continuously. In such a hybrid vehicle (HV) or an electric vehicle (EV), in the brake position, it attains the regenerative braking state in the forward driving state, and the motor generators generate electric power by regeneration.

Referring to FIG. 1, a control block of a vehicle control system according to an embodiment of the present invention is described. The vehicle control system 100 according to the present embodiment includes a driver's manipulation information detecting unit 1000 detecting manipulation information of a driver, a speed sensor 1100 detecting a speed of the vehicle, a driving assist unit 1200 acquiring external information for assisting driving of the driver, and a vehicle control device 2000 connected to driver's manipulation information detecting unit 1000, speed sensor 1100 and driving assist unit 1200.

Vehicle control system 100 further includes a vehicle driving/braking torque control device 3000 that is connected to vehicle control device 2000 and determines distribution of driving torque and braking torque of the vehicle, a power train control device 4000 performing control of the vehicle driving side, a brake ECU (Electronic Control Unit) 7000 performing control of the braking torque side, an engine ECU 5000 connected to power train control device 4000 and controlling an engine, an ECT (Electronic Control Transmission)_ECU 6000 controlling an automatic transmission, and a small distance control display device 6100.

Driver's manipulation information detecting unit 1000 includes various sensors detecting the manipulation information of the driver of the vehicle. For example, driver's manipulation information detecting unit 1000 includes an accelerator pedal opening sensor 1010, a brake switch sensor 1020, and a steering switch 1030. Steering switch 1030 is a switch in the form of a push button that is provided to a steering wheel for the driver to request movement by a small distance.

Speed sensor 1100 is a sensor detecting, e.g., the number of revolutions of the output shaft of the automatic transmission. Driving assist unit 1200 includes a device for acquiring external information for assisting driving of the driver of the vehicle. For example, driving assist unit 1200 includes a navigation device 1210 searching for a current position of the vehicle or a path to the destination, a millimeter wave radar 1220 measuring a distance to a vehicle ahead, and a vehicle exterior camera 1230 picking up an image of the condition ahead of or at the side of the vehicle. Driving assist unit 1200 further includes a vehicle interior camera 1240 picking up an image of the driver in the vehicle to detect the driver's posture and/or line of sight, and a clearance sonar 1250 in the form of an ultrasonic sensor attached to each corner of the vehicle.

Small distance control display device 6100 indicates whether it is currently in a small distance control mode or not, and also displays a target position and the like.

Vehicle control system 100 according to the present embodiment is characterized in that information of the vehicle itself detected by driver's manipulation information detecting unit 1000 and information of surroundings of the vehicle detected by driving assist unit 1200 are used to determine whether movement by a small distance is necessary or not, calculate a target position for the movement by the small distance, and control the engine, automatic transmission and wheel brake in an integrated manner to realize predetermined acceleration/deceleration from a control start position to a control finish position. It is assumed in the following description that the control as described above is realized by a program that is executed by vehicle control device 2000.

The way of achieving the features of the invention however is not limited to the use of the program executed by vehicle control device 2000. Another control device may be provided to implement the features of the present invention of determination as to whether movement by a small distance is necessary or not, calculation of the target position for the movement, and control during the movement.

Referring to FIGS. 2-6, a control structure of a program executed by vehicle control device 2000 of the vehicle control system according to the present embodiment is explained. FIG. 2 is a flowchart of a main program, and FIGS. 3-6 are flowcharts of sub-routine programs.

As shown in FIG. 2, in step (hereinafter, abbreviated as "S") 100, vehicle control device 2000 obtains information from driver's manipulation information detecting unit 1000. In S200, vehicle control device 2000 obtains information from driving assist unit 1210.

In S300, vehicle control device 2000 performs a determination process based on vehicle external environment information. This is explained as a sub-routine program, which will be described later in detail.

In S400, vehicle control device 2000 performs a determination process based on vehicle interior information. This is explained as a sub-routine program, which will be described later in detail.

In S500, vehicle control device 2000 performs a determination process based on driver's manipulation information. This is explained as a sub-routine program, which will be described later in detail.

In S600, vehicle control device 2000 performs an automatic vehicle edge-forward process. This is explained as a sub-routine program, which will be described later in detail.

Figure 3:
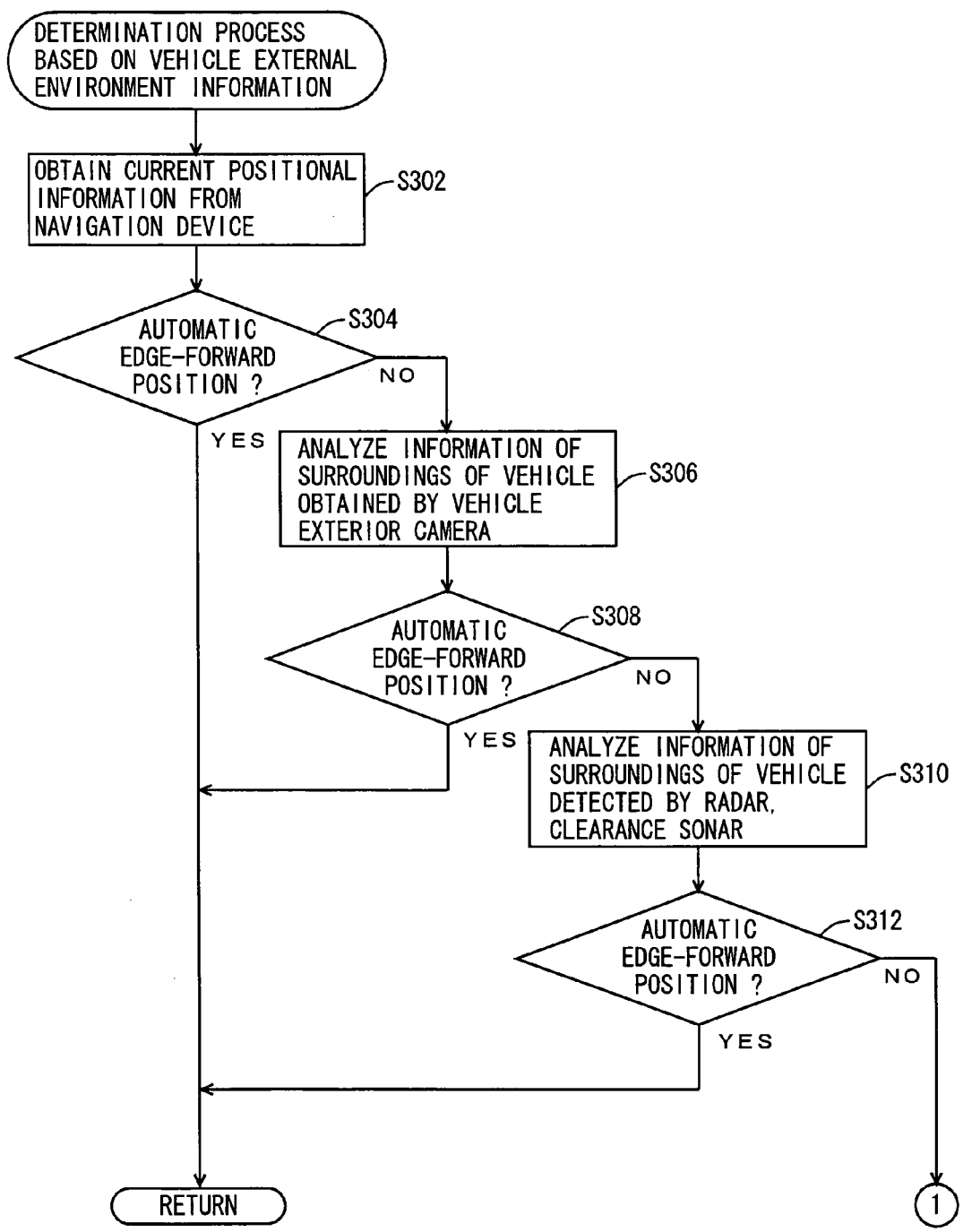
FIGS. 3-6 are flowcharts illustrating control structures of sub-routine programs that are executed at the vehicle control device of the vehicle control system according to the embodiment of the present invention.

Referring to FIG. 3, a control structure of the sub-routine program of the determination process based on the vehicle external environment information that is executed by vehicle control device 2000 of the vehicle control system according to the present embodiment is explained.

In S302, vehicle control device 2000 obtains current positional information of the vehicle from navigation device 1210. In S304, vehicle control device 2000 determines whether the current position of the vehicle corresponds to an automatic edge-forward position. This determination is made according to whether the current positional information of the vehicle corresponds to positional information of a blind intersection of poor visibility or the like that is stored in advance in a memory, linked with map information of navigation device 1210. If the current position of the vehicle corresponds to the automatic edge-forward position (YES in S304), the process exits from this sub-routine to return to S400 in FIG. 2. If not (NO in S304), the process goes to S306.

In S306, vehicle control device 2000 analyzes information of surroundings of the vehicle based on an image picked up by vehicle exterior camera 1230. For example, analysis is made as to whether the picked-up image of the scene ahead of the vehicle shows another vehicle running across the vehicle, whether the picked-up image of the scene in the vicinity of the vehicle shows a tall fence, or the like. In S308, vehicle control device 2000 determines whether the current position of the vehicle corresponds to an automatic edge-forward position, based on the result of analysis of the information of surroundings of the vehicle obtained by vehicle exterior camera 1230. If the current position of the vehicle corresponds to the automatic edge-forward position (YES in S308), the process exists from this sub-routine and returns to S400 in FIG. 2. If not (NO in S308), the process goes to S310.

In S310, vehicle control device 2000 analyzes information of surroundings of the vehicle from millimeter wave radar 1220 and clearance sonar 1250. For example, analysis is made as to whether millimeter wave radar 1220 has detected another vehicle running across the vehicle ahead of the vehicle, whether clearance sonar 1250 has detected a tall fence near any corner of the vehicle, or the like. In S312, vehicle control device 2000 determines whether the current position of the vehicle corresponds to an automatic edge-forward position, based on the result of analysis of the information of surroundings of the vehicle obtained by millimeter wave radar 1220 and clearance sonar 1250. If the current position of the vehicle is the automatic edge-forward position (YES in S312), the process exits from the sub-routine and returns to S400 in FIG. 2. If not (NO in S312), the process exits from the sub-routine, and the main program is also terminated. That is, the small distance control (automatic edge-forward control) of the vehicle is not performed.

Figure 4:
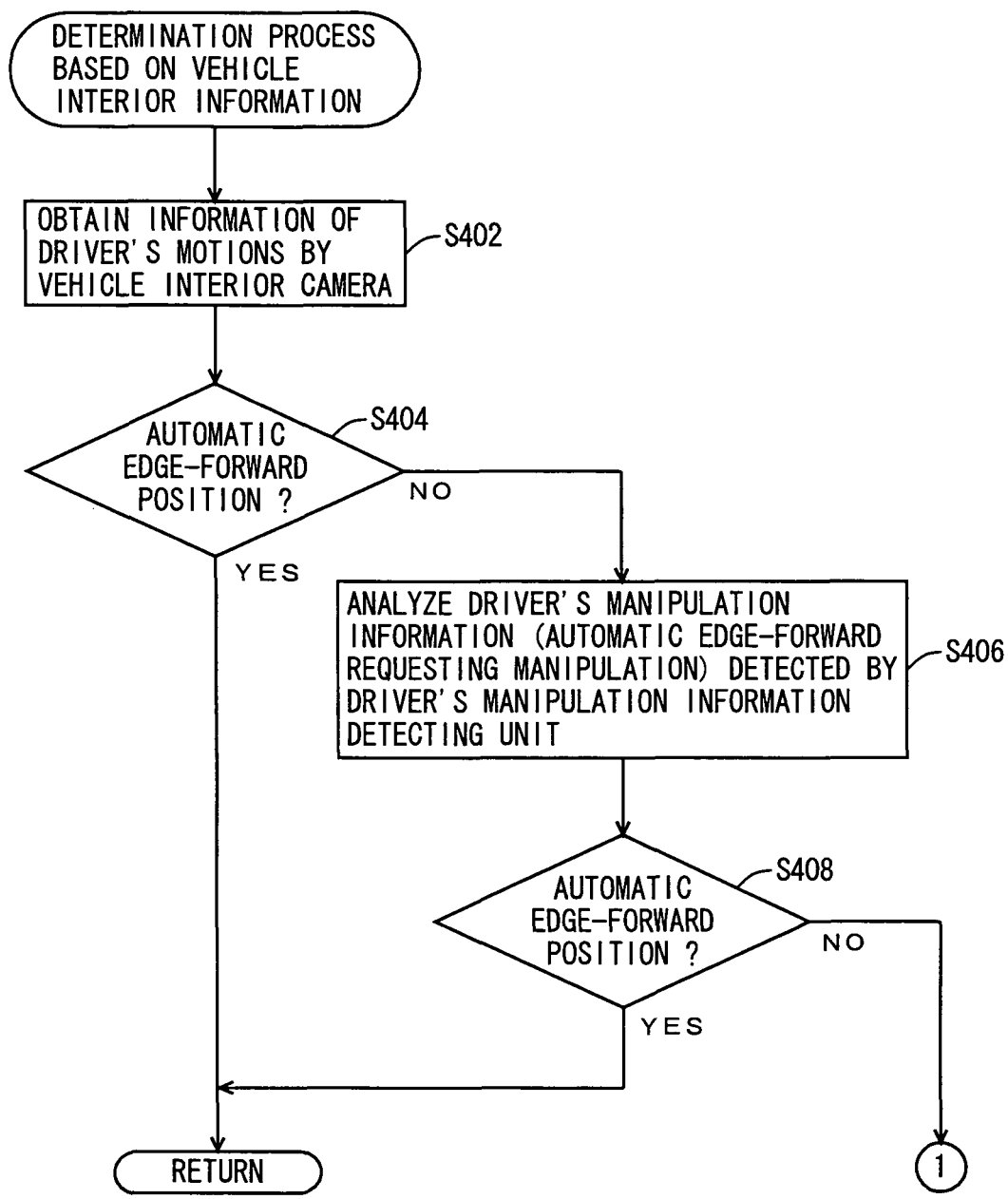

Referring to FIG. 4, a control structure of the sub-routine program of the determination process based on the vehicle interior information that is executed by vehicle control device 2000 of the vehicle control system according to the present embodiment is explained.

In S402, vehicle control device 2000 analyzes information of driver's motions based on an image picked up by vehicle interior camera 1240. For example, analysis is made as to whether the picked-up image of the driver in the vehicle shows that he/she is holding the steering wheel, leaning forward and turning his/her head to look to the right and left. In S404, vehicle control device 2000 determines whether the current position of the vehicle corresponds to an automatic edge-forward position, based on the result of analysis of the information of the driver's motions obtained by vehicle interior camera 1240. If the current position of the vehicle is the automatic edge-forward position (YES in S404), the process exits the sub-routine and returns to S400 in FIG. 2. If not (NO in S404), the process goes to S406.

In S406, vehicle control device 2000 analyzes presence/absence of an automatic edge-forward requesting manipulation of the driver from driver's manipulation information detected by driver's manipulation information detecting unit 1000. For example, analysis is made as to whether the driver has depressed steering switch 1030 in the form of the push button provided at the steering wheel to request movement by a small distance. In S408, vehicle control device 2000 determines whether the current position of the vehicle corresponds to an automatic edge-forward position, based on the result of analysis of the driver's manipulation information detected by driver's manipulation information detecting unit 1000. If the current position of the vehicle is the automatic edge-forward position (YES in S408), the process exits from this sub-routine and returns to S400 in FIG. 2. If not (NO in S408), the process exits from the sub-routine, and the main program is also terminated. That is, the small distance control (automatic edge-forward control) of the vehicle is not effected.

Figure 5:
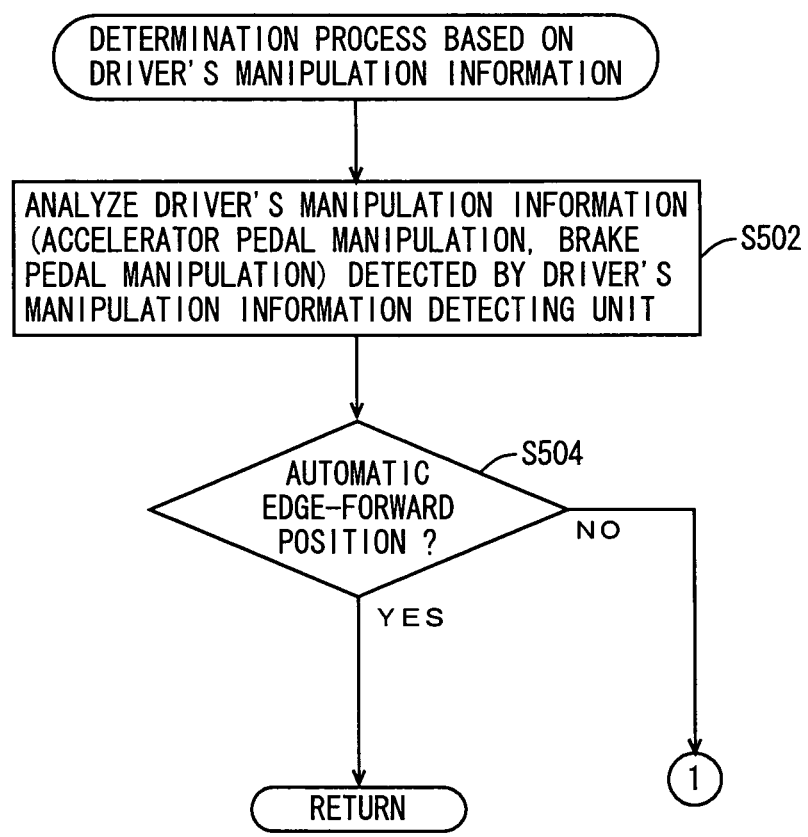

Referring to FIG. 5, a control structure of the sub-routine program of the determination process based on the driver's manipulation information that is executed by vehicle control device 2000 of the vehicle control system according to the present embodiment is explained.

In S502, vehicle control device 2000 analyzes the driver's manipulation information (accelerator pedal manipulation, brake pedal manipulation) detected by accelerator pedal opening sensor 1010 and brake switch sensor 1020 of driver's manipulation information detecting unit 1000. For example, analysis is made as to whether the driver is repeatedly stepping on the accelerator pedal and/or the brake pedal within a short period of time to try to move the vehicle frontward little by little, or whether the driver is slowly releasing the brake pedal, while not stepping on the accelerator pedal, to try to move the vehicle frontward little by little by the effect of creep. In these cases, it is considered that automatic edge-forward control is required due to poor visibility. In S504, vehicle control device 2000 determines whether the current position of the vehicle corresponds to an automatic edge-forward position, based on the result of analysis of the driver's manipulation information (accelerator pedal manipulation, brake pedal manipulation) detected by driver's manipulation information detecting unit 1000. If the current position of the vehicle is the automatic edge-forward position (YES in S504), the process exits from this sub-routine and returns to S400 in FIG. 2. If not (NO in S504), the process exits from the sub-routine, and the main program is also terminated. That is, the small distance control (automatic edge-forward control) of the vehicle is not effected.

Figure 6:
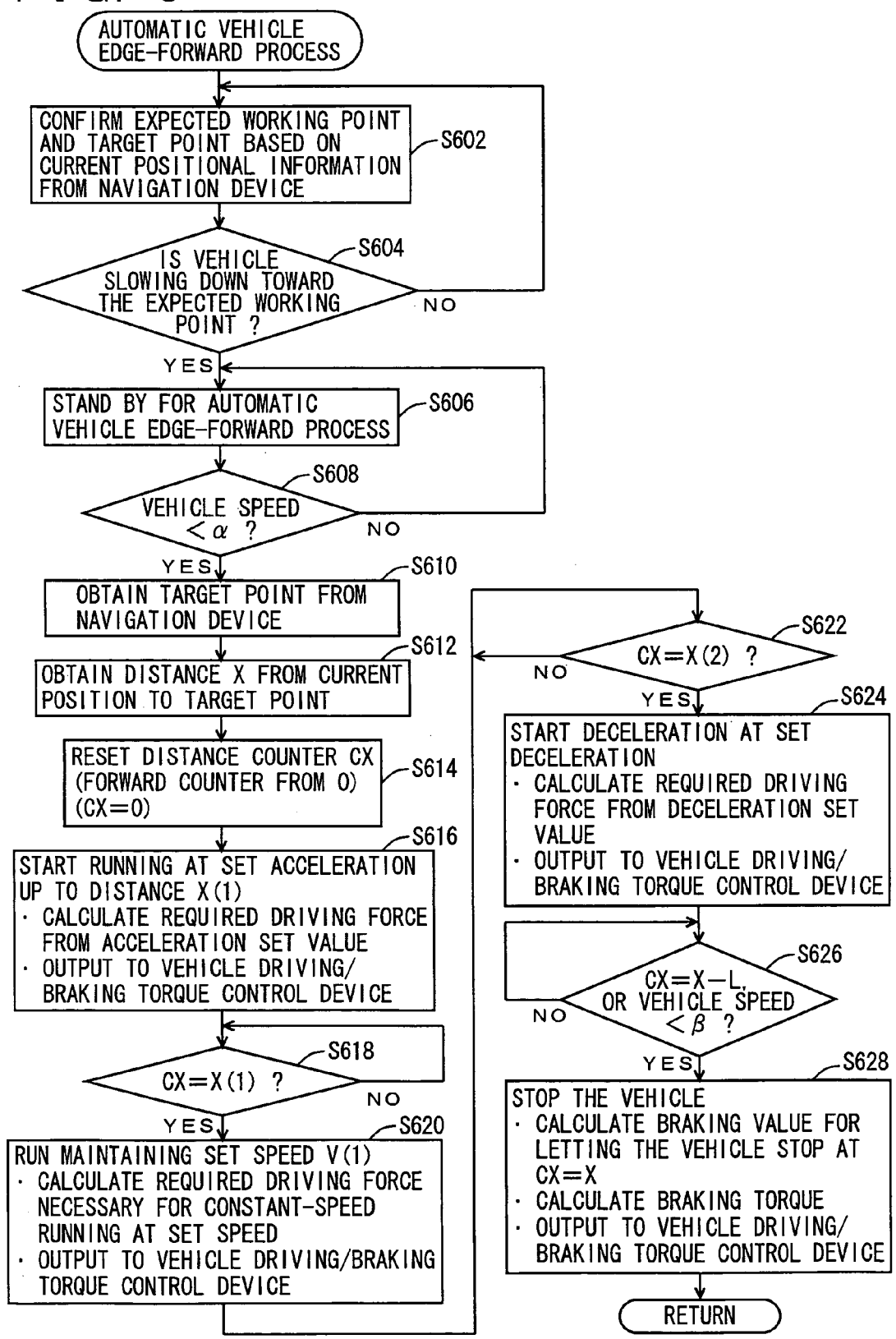

Referring to FIG. 6, a control structure of the sub-routine program of the automatic vehicle edge-forward process that is executed by vehicle control device 2000 of the vehicle control system according to the present embodiment is explained.

In S602, vehicle control device 2000 confirms an expected working point and a target point of automatic edge-forward control, based on the current positional information of the vehicle detected by navigation device 1210. This is carried out based on the positional information of the vehicle detected by navigation device 1210 and the map information stored in navigation device 1210.

In S604, vehicle control device 2000 determines whether the vehicle is slowing down to approach the expected working point. At this time, vehicle control device 2000 determines whether the vehicle speed is being decreased toward the expected working point, based on the current positional information of the vehicle input from navigation device 1210 and on a time differential value of the speed of the vehicle input from speed sensor 1100. If the vehicle is being slowed down to approach the expected working point (YES in S604), the process goes to S606. If not (NO in S604), the process returns to S602. Alternatively, it may return to S604 in the case of NO in S604.

In S606, vehicle control device 2000 enters a stand-by state for the automatic vehicle edge-forward process. In S608, vehicle control device 2000 determines whether the vehicle speed is smaller than a predetermined speed threshold α. At this time, vehicle control device 2000 makes the determination based on the speed value of the vehicle that is input from speed sensor 1100. If the vehicle speed<α(YES in S608), the process goes to S610. If not NO in S608), the process returns to S606. Alternatively, it may return to S608 in the case of NO in S608.

In S610, vehicle control device 2000 obtains a target point from navigation device 1210, although it may be configured to obtain the target point from vehicle exterior camera 1230. In S612, vehicle control device 2000 obtains a distance X from the current position to the target point. In S614, vehicle control device 2000 initializes (reset: CX=0) a distance counter CX (forward counter from 0). Distance counter CX may be a backward counter instead of the forward counter. In the case of the backward counter, CX=X when initialized.

In S616, vehicle control device 2000 starts running at set acceleration up to distance X (1). At this time, vehicle control device 2000 calculates a required driving force from the acceleration set value, and outputs the required driving force to vehicle driving/braking torque control device 3000. Vehicle driving/braking torque control device 3000 determines distribution of the driving torque and the braking torque for producing the input required driving force to the vehicle, and outputs a driving torque command signal and a braking torque command signal via power train control device 4000 to engine ECU 5000 and ECT_ECU 6000, and to brake ECU 7000. This means that the driving system and the braking system are controlled in an integrated manner.

In S618, vehicle control device 2000 determines whether distance counter CX has reached X (1). X (1) is a positive value greater than 0 and smaller than X (2) that will be described later. If distance counter CX=X (1) (YES in S618), the process goes to S620. If not (NO in S618), the process returns to S616, and the vehicle moves while being accelerated at the set acceleration until distance counter CX reaches X (1).

In S620, to make the vehicle run maintaining a set speed V (1), vehicle control device 2000 calculates a required driving force necessary for such constant-speed running at the set speed, and outputs the required driving force to vehicle driving/braking torque control device 3000. Vehicle driving/braking torque control device 3000 determines distribution of the driving torque and the braking torque for producing the input required driving force to the vehicle, and outputs a driving torque command signal and a braking torque command signal via power train control device 4000 to engine ECU 500 and ECT_ECU 6000, and to brake ECU 7000.

In S622, vehicle control device 2000 determines whether distance counter CX has reached X (2). If distance counter CX=X (2) (YES in S622), the process goes to S624. If not (NO in S622), the process returns to S622, and the vehicle moves constantly at set speed V (1) until distance counter CX reaches X (2).

In S624, vehicle control device 2000 starts deceleration at set deceleration. At this time, vehicle control device 2000 calculates a required driving force from the deceleration set value, and outputs the required driving force to vehicle driving/braking torque control device 3000. Vehicle driving/braking torque control device 3000 determines distribution of the driving torque and the braking torque for producing the input required driving force to the vehicle, and outputs a driving torque command signal and a braking torque command signal via power train control device 4000 to engine ECU 5000 and ECT_ECU 6000, and to brake ECU 7000.

In S626, vehicle control device 2000 determines whether distance counter CX has reached (X−L) (L is a small positive value) or the vehicle speed has become smaller than β(β is a small positive value). If distance counter CX=(X-L) or the vehicle speed<β(YES in S626), the process goes to S628. If not (NO in S626), the process returns to S626, and the vehicle moves while being decelerated at the set deceleration until distance counter CX reaches (X−L) or the vehicle speed becomes smaller than β.

In S628, vehicle control device 2000 performs a vehicle stopping process. At this time, vehicle control device 2000 calculates a braking value for letting the vehicle stop at CX=X, calculates braking torque from the braking value, and outputs the braking torque to vehicle driving/braking torque control device 3000. Vehicle driving/braking torque control device 3000 determines braking torque (total braking torque by the engine brake and the wheel brake by the power train) for producing the input braking torque to the vehicle, and outputs a braking torque command signal via power train control device 4000 to engine ECU 5000 and ECT_ECU 6000, and to brake ECU 7000.

Hereinafter, an operation of vehicle control system 100 of the present embodiment based on the above-described structures and flowcharts will be described.

When a running vehicle approaches a blind intersection of poor visibility, the current positional information of the vehicle detected by navigation device 1210 is obtained (S302), and it is determined that automatic edge-forward control is necessary (YES in S304). Even if the determination that the automatic edge-forward control is necessary is not made with the current positional information detected by navigation device 1210 (NO in S304), the information of surroundings of the vehicle picked up by vehicle exterior camera 1230 is analyzed (S306) and, if the picked-up image shows an obstacle (e.g., a tall fence) blocking the driver's view in the vicinity of the vehicle, then it is determined that the automatic edge-forward control is necessary (YES in S308). Further, even if the determination that the automatic edge-forward control is necessary is not made with the current positional information detected by navigation device 1210 or by the information of surroundings of the vehicle detected by vehicle exterior camera 1230 (NO in S304, NO in S306), the information of surroundings of the vehicle detected by millimeter wave radar 1220 and/or clearance sonar 1250 is analyzed (S310) and, if an obstacle (e.g., a tall fence) blocking the driver's view is detected in the vicinity of the vehicle, then it is determined that the automatic edge-forward control is necessary (YES in S312).

Further, if the image of the driver of the vehicle holding the steering wheel, leaning forward and turning his/her head to look to the right and left is detected in the image picked up by vehicle interior camera 1240, then it is determined that the automatic edge-forward control is necessary (YES in S404). Further, if depression of steering switch 1030 by the driver of the vehicle to request movement by a small distance is detected, then it is determined that the automatic edge-forward control is necessary (YES in S408).

Still further, if the driver of the vehicle is repeatedly stepping on the accelerator pedal and/or the brake pedal within a short period of time to try to move the vehicle frontward little by little, or if the driver is slowly releasing the brake pedal, without stepping on the accelerator pedal, to try to move the vehicle frontward little by little by the effect of creep, then it is determined that the automatic edge-forward control is necessary (YES in S504).

When it is thus determined that the automatic edge-forward control is necessary, an expected working point and a target point of the automatic edge-forward control are confirmed (S602). When the vehicle is slowing down while approaching the expected working point (YES in S604), the system enters a stand-by state for the automatic vehicle edge-forward control (S606).

When the vehicle speed becomes lower than a (YES in S608), the target point is obtained from navigation device 1210 or vehicle external camera 1230 (S610), distance X from the current position to the target point is obtained (S612), and distance counter CX is reset (CX=0) (S614).

Running of the vehicle at set acceleration from the current position (control start point) to distance X (1) is started. At this time, a required driving force is calculated from the acceleration set value, and the required driving force is output to vehicle driving/braking torque control device 3000. Distribution of the driving torque and the braking torque for producing the input required driving force to the vehicle is determined by vehicle driving/braking torque control device 3000, and a driving torque command signal and a braking torque command signal are output via power train control device 4000 to engine ECU 5000 and ECT_ECU 6000, and to brake ECU 7000. As such, the engine, the automatic transmission and the wheel brake are controlled in an integrated manner.

Figure 7:
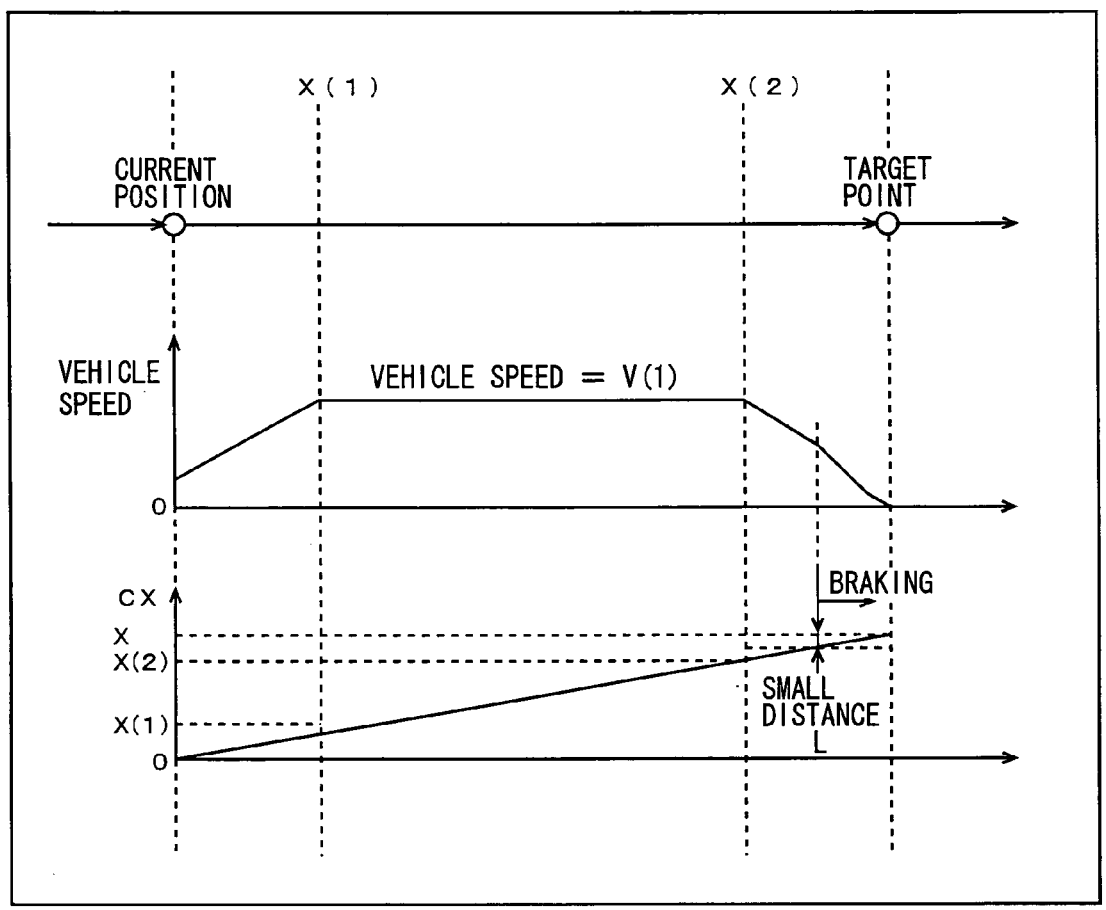
FIG. 7 illustrates an operation of a vehicle mounted with the vehicle control device of the vehicle control system according to the embodiment of the present invention.

When distance counter CX attains X (1) (YES in S618), the vehicle ceases acceleration and travels maintaining the set speed V (1). The state at this time is shown in FIG. 7. As shown in FIG. 7, the vehicle is accelerated at predetermined acceleration until distance counter CX reaches X (1), and when distance counter CX attains X (1), the vehicle travels at constant speed V (1).

With the vehicle traveling at constant speed V (1), when distance counter CX reaches X (2) (YES in S622), the vehicle starts deceleration. At this time, as shown in FIG. 7, deceleration at constant deceleration starts when distance counter CX attains X (2).

In the decelerated running, the vehicle further approaches the target point. When distance counter CX reaches (X−L) or the vehicle speed becomes smaller than β, the vehicle stopping process is performed. Specifically, braking control is carried out such that the vehicle can completely stops at the target point X of the automatic edge-forward control.

As described above, according to the vehicle control system of the present embodiment, determination is made as to whether automatic edge-forward control is necessary or not based on positional information of the vehicle, information of surroundings of the vehicle, motions of the driver of the vehicle, and others. When the automatic edge-forward control is necessary, the vehicle control system automatically calculates a target position, and the engine, the automatic transmission and the wheel brake are controlled in an integrated manner to cause the vehicle to run at predetermined acceleration, speed, and deceleration. As a result, it is possible to provide a vehicle control system that can reduce manipulation burden of the driver who wants to move the vehicle by a small distance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for a vehicle causing a vehicle to move by a small distance, comprising:
   a determination unit configured to determine whether movement by the small distance is necessary;
   an acquisition unit, when it is determined that said movement by the small distance is necessary, configured to acquire positional information on a control start position where said movement by the small distance is to be started and positional information on a control finish position where said movement by the small distance is to be finished, said positional information on a control start position being acquired from a navigation unit; and
   a control unit configured to control a driving device and a braking device mounted to said vehicle, based on said acquired positional information, to move said vehicle from said control start position to said control finish position;
   said determination unit including
      a first determination unit configured to determine whether movement by the small distance is necessary, based on information on an external environment of the vehicle acquired by an external information acquisition unit acquiring information on the external environment of said vehicle and information on an obstacle blocking a driver's view that is stored in advance in association with said information on the external environment, and
      a second determination unit configured to determine whether movement by the small distance is necessary, based on information on motions of a driver of said vehicle and said information on an obstacle blocking a driver's view that is stored in advance in association with said information on motions.

2. The control device for a vehicle according to claim 1, wherein said control unit controls acceleration during said movement by the small distance.

3. The control device for a vehicle according to claim 2, wherein said control unit calculates a required driving force for producing predetermined acceleration from said control start position, and controls said driving device and said braking device in an integrated manner based on said required driving force.

4. The control device for a vehicle according to claim 2, wherein said control device calculates a required driving force for producing predetermined deceleration from a position ahead of said control finish position, and controls said driving device and said braking device in an integrated manner based on said required driving force.

5. The control device for a vehicle according to claim 1, wherein said external information acquisition unit acquires said information on the external environment of said vehicle based on information acquired by at least one of a navigation device, a radar device, a camera, and communication with the outside of said vehicle.

6. The control device for a vehicle according to claim 1, wherein an internal information acquisition unit acquires said information on the motions of the driver based on information acquired by at least one of a vehicle driving manipulation unit and a vehicle interior camera.

7. The control device for a vehicle according to claim 6, wherein said vehicle driving manipulation unit is one of an accelerator manipulation member, a brake manipulation member, and a small distance movement requesting manipulation member.

8. A control device for a vehicle causing a vehicle to move by a small distance, comprising:
   determination means for determining whether movement by the small distance is necessary;
   acquisition means, when it is determined that said movement by the small distance is necessary, for acquiring positional information on a control start position where said movement by the small distance is to be started and positional information on a control finish position where said movement by the small distance is to be finished, said positional information on a control start position being acquired from a navigation unit; and
   control means for controlling a driving device and a braking device mounted to said vehicle, based on said acquired positional information, to move said vehicle from said control start position to said control finish position;
   said determination means including
      a first determination means for determining whether movement by the small distance is necessary, based on information on an external environment of the vehicle acquired by external information acquisition means acquiring information on the external environment of said vehicle and information on an obstacle blocking a driver's view that is stored in advance in association with said information on the external environment, and
      second determination means for determining whether movement by the small distance is necessary, based on information on motions of a driver of said vehicle and said information on an obstacle blocking a driver's view that is stored in advance in association with said information on motions.

9. The control device for a vehicle according to claim 8, wherein said control means includes means for controlling acceleration during said movement by the small distance.

10. The control device for a vehicle according to claim 9, wherein said control means includes means for calculating a required driving force for producing predetermined acceleration from said control start position, and controlling said driving device and said braking device in an integrated manner based on said required driving force.

11. The control device for a vehicle according to claim 9, wherein said control means includes means for calculating a required driving force for producing predetermined deceleration from a position ahead of said control finish position, and controlling said driving device and said braking device in an integrated manner based on said required driving force.

12. The control device for a vehicle according to claim 8, wherein said external information acquisition means includes means for acquiring said information on the external environment of said vehicle based on information acquired by at least one of a navigation device, a radar device, a camera, and communication with the outside of said vehicle.

13. The control device for a vehicle according to claim 8, wherein an internal information acquisition means includes means for acquiring said information on the motions of the driver based on information acquired by at least one of a vehicle driving manipulation unit and a vehicle interior camera.

14. The control device for a vehicle according to claim 13, wherein said vehicle driving manipulation unit is one of an accelerator manipulation member, a brake manipulation member, and a small distance movement requesting manipulation member.

15. A control device for a vehicle causing a vehicle to move by a small distance, comprising:
a determination unit configured to determine whether movement by the small distance is necessary;
an acquisition unit, when it is determined that said movement by the small distance is necessary, configured to acquire positional information on a control start position where said movement by the small distance is to be started and positional information on a control finish position where said movement by the small distance is to be finished, based on information of said vehicle itself and information of surroundings of said vehicle;
a control unit configured to control a driving device and a braking device mounted to said vehicle, based on said acquired positional information, to move said vehicle from said control start position to said control finish position; and
an external information acquisition unit configured to acquire information on an external environment of said vehicle,
wherein said determination unit configured to determine that start of said movement by the small distance is necessary when said vehicle approaches an intersection, based on said information on the external environment.

16. The control device for a vehicle according to claim 15, wherein said control unit controls acceleration during said movement by the small distance.

17. The control device for a vehicle according to claim 16, wherein said control unit calculates a required driving force for producing predetermined acceleration from said control start position, and controls said driving device and said braking device in an integrated manner based on said required driving force.

18. The control device for a vehicle according to claim 16, wherein said control device calculates a required driving force for producing predetermined deceleration from a position ahead of said control finish position, and controls said driving device and said braking device in an integrated manner based on said required driving force.

19. The control device for a vehicle according to claim 15, wherein said external information acquisition unit acquires said information on the external environment of said vehicle based on information acquired by at least one of a navigation device, a radar device, a camera, and communication with the outside of said vehicle.

* * * * *